United States Patent [19]

Firebaugh

[11] Patent Number: 4,792,938

[45] Date of Patent: Dec. 20, 1988

[54] LOW-NOISE BEARING FOR PHONOGRAPH TURNTABLES AND THE LIKE

[76] Inventor: William H. Firebaugh, 3108 McKinley Way, Costa Mesa, Calif. 92626

[21] Appl. No.: 81,020

[22] Filed: Aug. 3, 1987

[51] Int. Cl.[4] .................. G11B 3/60; F16C 17/10; F16C 35/08
[52] U.S. Cl. ................................. 369/269; 384/227; 384/228; 384/263
[58] Field of Search ................ 369/269; 384/227, 228, 384/258, 263

[56] References Cited

U.S. PATENT DOCUMENTS

| | | | |
|---|---|---|---|
| 4,082,293 | 4/1978 | Schouwenaars | 369/269 |
| 4,371,229 | 2/1983 | Brucher | 369/269 |
| 4,731,985 | 3/1988 | Menegatto | 384/227 |

*Primary Examiner*—Steven L. Stephan
*Attorney, Agent, or Firm*—Lawrence Fleming

[57] ABSTRACT

A low-noise (low "rumble") segmented bearing for high-fidelity phonograph turntables and the like. In a preferred belt-driven form, the bearing consists of four small, spaced polyurethane pads disposed so that the tension of the belt keeps the shaft in contact with all of them. A fifth pad supports the end of the shaft. The bearing is immersed in lubricant.

4 Claims, 1 Drawing Sheet

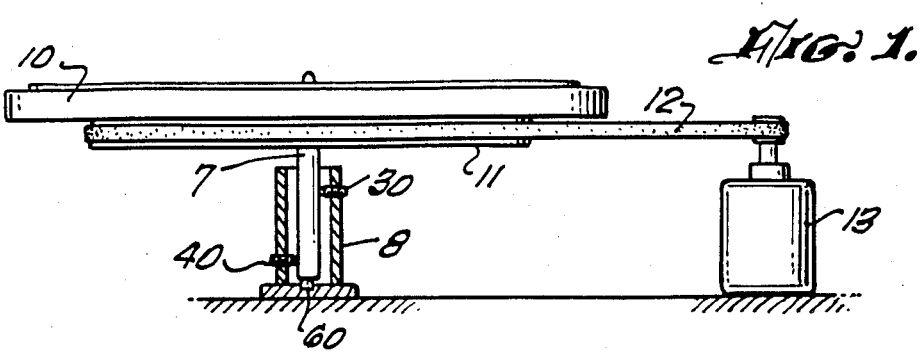
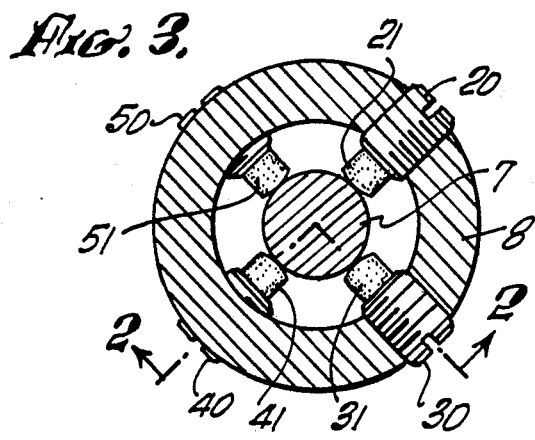
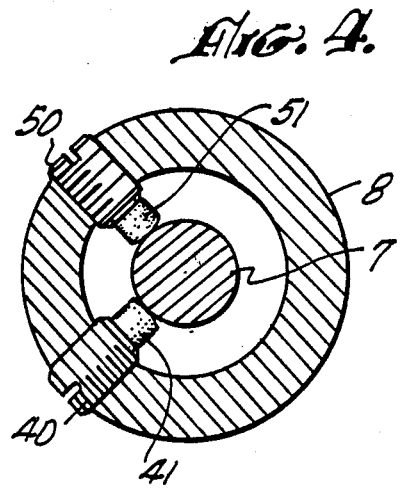
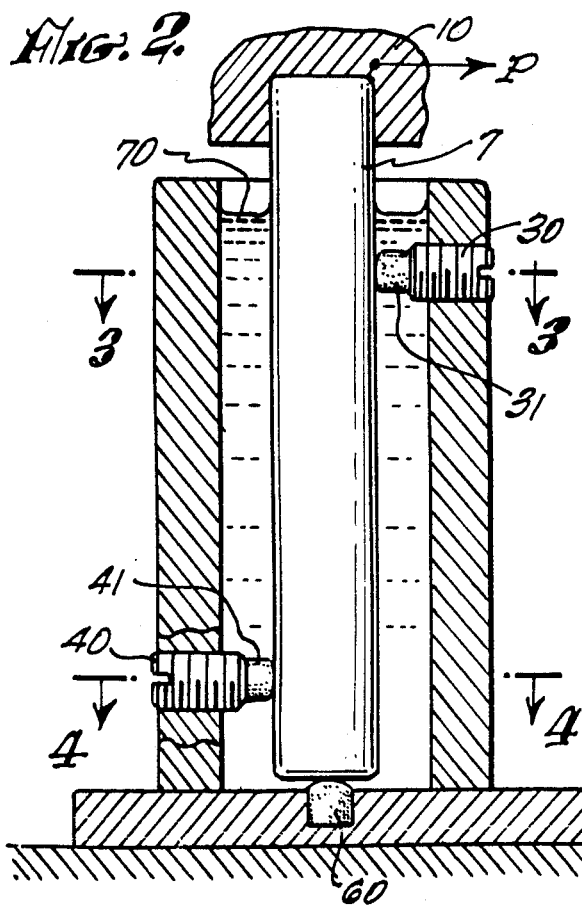
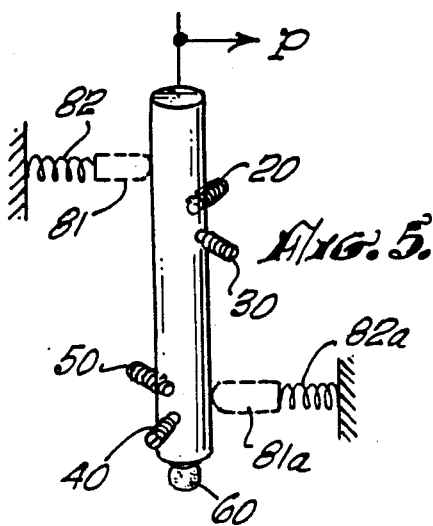

LOW-NOISE BEARING FOR PHONOGRAPH TURNTABLES AND THE LIKE

BACKGROUND OF THE INVENTION

In sound reproduction and in scientific instruments there is a need for mechanical elements that rotate with extreme uniformity of speed and freedom from side play and other such disturbances. High-fidelity phonograph turntables have particularly stringent requirements. In an ordinary 33⅓ rpm "LP" disc record, the maximum recording amplitude or groove displacement is about 0.0023 cm. From a frequency of about 1 KHz down to about 40 Hz, this maximum remains the same; the output of a magnetic phonograph pickup varies, however, directly with frequency so that the electrical signal at 40 Hz is about 1/25 that at 1 KHz. Hence, in practice, the signal is equalized electrically, the amplifier gain being about 25 times greater at 40 Hz than at 1 KHz. Thus, the effect of a given mechanical disturbance of the turntable is 25 times greater at the lower frequency: a disturbance of 0.0023/25 or about $10^{-4}$ cm at 40 Hz produces an electrical signal, after equalization, equivalent to maximum groove modulation. Assuming now a desired signal-to-noise ratio of 60 db or 1000:1, any undesired mechanical disturbance or "noise" at around 40 Hz should be less than 0.0023/(25×1000) cm, or about $10^{-7}$ cm. This is about 10 Angstrom units, of the order of atomic dimensions.

For phonograph turntable bearings and tape recorder capstan bearings and the like, it has been customary to use closely-fitted sleeve bearings of generally conventional design, with thrust washers or ball thrust bearings supporting the end of the shaft. Ball bearings are known to produce more noise or mechanical disturbances or irregularities than plain bearings, because the balls cannot be exactly spherical, nor the ball races precisely round.

Sleeve bearings, however, have a tendency for the shaft to wander in the bore, producing so-called turntable rumble in phonograph applications. A need still exists for a bearing that constrains a shaft to purer rotary motion with less lateral and longitudinal "noise" disturbance than heretofore.

SUMMARY OF THE INVENTION

A shaft is supported and constrained laterally in a pair of novel segmented bearings. These consist of two pairs of relatively small bearing pads. Each pair is disposed in a common plane perpendicular to the axis of the shaft; and the pads of each pair are disposed at an angle (such as 90°) to each other. The pairs are spaced along the length of the shaft and, in the preferred form of the invention, face in opposite directions. Contact of the shaft with both pairs of pads is maintained by a suitable steady force, such as the tension of a drive belt. When the shaft is vertical, as in a phonograph turntable, the lower end of the shaft may rest on a thrust pad. The pads are preferably made of a suitable material softer than the shaft, such as polyurethane. Shaft and pads are preferably disposed in a housing filled with a suitable lubricant, preferably a heavy oil.

Where belt tension is not available or adequate to maintain pad contact, auxiliary pads may be added, urged by springs into contact with the shaft to press the shaft against the fixed bearing pads.

This bearing structure supports the shaft at a number of spaced points sufficient, and only sufficient, to determine its position in space. The principle may be considered somewhat analogous to the practice in supporting the surface plates used in precise measurements: they are supported at only three designated points. In the mechanical instrument art, such supports have been called "kinematic".

BRIEF DESCRIPTION OF THE DRAWINGS

FIG. 1 is a semi-diagrammatic side view, partly in section, of a phonograph turntable assembly according to the invention;

FIG. 2 is a side sectional view of a bearing assembly according to the invention;

FIG. 3 is a section on line 3—3 of FIG. 2;

FIG. 4 is a section on line 4—4 of FIG. 2; and

FIG. 5 is a diagrammatic perspective view of a shaft and bearing pads, with auxiliary pads indicated in broken lines.

DETAILED DESCRIPTION

FIG. 1 shows a phonograph turntable 10 driven by a suitable motor 13 through a belt 12 in known manner engaging the turntable at 11. A central vertical shaft 7 supports the turntable 10 and rides in a novel segmented bearing structure of the invention indicated in part at 30, 40, 60.

FIGS. 2-4 show the novel bearing structure in more detail. In FIG. 2, the shaft 7 is shown with a small attached portion of turntable 10. The lateral force due to the tension of the belt 12 (FIG. 1) is indicated by arrow P adjacent the upper end of shaft 7 (an additional downward force due to gravity is understood).

In FIG. 2, two of the bearing pads are shown at 31, 41. These support shaft 7 against the lateral force resultants of force P. Since force P is applied above pad 30, this pad acts as a fulcrum. Accordingly, the pads are oppositely disposed.

To completely fix the position of shaft 7 in the horizontal plane, the pads are disposed in angularly-displaced pairs, on the principle of a machinist's V-block, FIGS. 3-5. The bottom of shaft 7 is supported by a pad 60. In FIG. 3, the upper pair of pads is shown at 21, 31 and the lower pair at 41, 51. In FIG. 4, only the lower pair of pads appears at 41, 51. The general spatial arrangement of shaft and pads is indicated in the diagrammatic perspective view of FIG. 5.

Also indicated in FIG. 5 are some alternative auxiliary pads 81, 81a disposed to apply some pressure against shaft 7 to maintain it in contact with the fixed bearing pads, should this be desirable, as in shipping and handling. Auxiliary pads are urged against shaft 7 by suitable springs 82, 821. In one successful form of the invention, they are not needed.

In a working model of the invention, the pads 21-51 are fitted into the ends of adjusting screws 20, 30, 40, 50, respectively. The screws pass through tapped holes in the wall portion of a suitable housing 8, which is preferably filled with a suitable lubricant, such as a heavy oil.

I claim:

1. A phonograph turntable having a central shaft,
a housing surrounding said shaft, and
low-noise bearing means fixed in said housing and engaging slidably the cylindrical surface of said shaft and comprising:
a first and a second pair of small, angularly-spaced, fixed bearing pads, said pads being linearly spaced along said shaft to provide bearing engagement therewith at four spaced points, and further comprising:

two pairs of adjusting screws extending through the wall of said housing, one of said pads being fastened to the inner end of each said screw, the end of each said pad being shaped as a generally convex figure of revolution.

2. The combination of claim 1, further comprising:

an end support bearing pad in the bottom of said housing and engaging the lower end of said shaft.

3. A phonograph turntable having a central shaft, a housing surrounding said shaft and closed at the bottom and having an upper rim portion, and low-noise bearing means fixed in said housing and engaging slidably the cylindrical surface and the flat lower end of said shaft and comprising:

an upper and a lower pair of small, generally convex, angularly-spaced fixed radial bearing pads, said pairs being linearly spaced along said shaft and facing generally oppositely, and supporting said cylindrical surface at four spaced points, and a small generally convex fixed thrust pad disposed to engage and support said lower end generally in point contact, all said pads being of a plastic-like material which is soft compared to said shaft, said upper pair being disposed substantially below said upper rim of said housing.

4. The combination of claim 3 wherein said housing is shaped to provide a substantial clearance space around said shaft, and further comprising a filling of lubricant in said space, said filling submerging all said bearing means.

* * * * *